United States Patent
Xu

(10) Patent No.: US 11,438,902 B2
(45) Date of Patent: Sep. 6, 2022

(54) METHOD FOR DETERMINING SLOT FORMAT, TERMINAL DEVICE AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/170,823

(22) Filed: Feb. 8, 2021

(65) Prior Publication Data
US 2021/0160884 A1    May 27, 2021

Related U.S. Application Data

(63) Continuation of application No. PCT/CN2018/101188, filed on Aug. 17, 2018.

(51) Int. Cl.
*H04W 72/04* (2009.01)

(52) U.S. Cl.
CPC ..... *H04W 72/0493* (2013.01); *H04W 72/042* (2013.01); *H04W 72/0446* (2013.01)

(58) Field of Classification Search
CPC ........... H04W 72/0493; H04W 72/042; H04W 72/0446
See application file for complete search history.

(56) References Cited

U.S. PATENT DOCUMENTS

| 2016/0345311 | A1* | 11/2016 | Chen | H04W 72/0446 |
| 2018/0206226 | A1 | 7/2018 | Zeng et al. | |
| 2019/0335458 | A1* | 10/2019 | Sun | H04W 72/0453 |
| 2020/0389803 | A1* | 12/2020 | Sun | H04L 5/0094 |

FOREIGN PATENT DOCUMENTS

| CN | 102056237 A | 5/2011 |
| CN | 104104424 A | 10/2014 |
| CN | 106936493 A | 7/2017 |
| CN | 108282315 A | 7/2018 |

(Continued)

OTHER PUBLICATIONS

U.S. Appl. No. 62/607,758, filed Dec. 19, 2017, corresponds to US 2020/0389803 A1. (Year: 2017).*

(Continued)

*Primary Examiner* — Melvin C Marcelo
(74) *Attorney, Agent, or Firm* — Perkins Coie LLP

(57) ABSTRACT

A method for determining a slot-format includes that: a terminal device receives an indication signal from a network device, the indication signal having a first association with a downlink transmission opportunity obtained by the network device; and the terminal device determines a slot format according to the indication signal. Another method for determining a slot format includes that: a network device sends an indication signal after obtaining a downlink transmission opportunity, the indication signal having a first association with the downlink transmission opportunity and the indication signal being used for a terminal device to determine a slot format. A terminal device and a network device are also provided.

15 Claims, 3 Drawing Sheets

(56) References Cited

FOREIGN PATENT DOCUMENTS

| RU | 2409896 C2 | 1/2011 |
|---|---|---|
| WO | 2018132686 A1 | 7/2018 |

OTHER PUBLICATIONS

R1-1612120, 'DL Control Channel Design for NR', MediaTek, 3GPP TSG RAN WG1 Meeting #87, Nov. 14-18, 2016, pp. 1-4. (Year: 2016).*
International Search Report in the international application No. PCT/CN2018/101188, dated May 23, 2019.
Qualcomm Incorporated: "Remaining issues on slot format indication", 3GPP Draft; R1-1716416 SFI Remaining, vol. RAN WG1, No. Nagoya, Japan; Sep. 18, 2017-Sep. 21, 2017 Sep. 17, 2017 (Sep. 17, 2017), XP051339871, Section 1—Introduction, p. 6. 11 pages.
NTT DOCOMO et al: "Remaining issues on group-common PDCCH", 3GPP Draft; R1-1718205. vol. RAN WG1, No. Prague, CZ; Oct. 9, 2017-Oct. 13, 2017 Oct. 8, 2017 (Oct. 8, 2017), XP051341387, Section 1—Introduction, Section 2.4, p. 6. 10 pages.
Supplementary European Search Report for European application No. 18930434.8, dated Jun. 15, 2021. 8 pages.
First Office Action of the Russian application No. 2021106155, dated Sep. 28, 2021. 10 pages with English translation.
First Office Action of the European application No. 18930434.8, dated Mar. 28, 2022. 4 pages.
Office Action for Canadian Application No. 3109178 dated Feb. 24, 2022. 4 pages.
Office Action of the Indian application No. 202117009823, dated Feb. 2, 2022. 6 pages with English translation.
Oppo "Frame structure for NR-U" 3GPP TSG RAN WG1 Meeting #94 R1-1808896, Gothenburg, Sweden, Aug. 20-24, 2018. 3 pages.
Sony "Considerations on frame structure for NR unlicensed operations" 3GPP TSG RAN WG1 Meeting #93 R1-1806567, Busan, Korea, May 21-25, 2018. 3 pages.
Qualcomm Incorporated "Summary on remaining issues on GC-PDCCH carrying SFI" 3GPP TSG RAN WG1 #92 R1-1803270, Feb. 26-Mar. 2, 2018, Athens, Greece. 12 pages.
Catt "On UE procedures for SFI reception" 3GPP TSG RAN WG1 Meeting #93 R1-1806290, Busan, Korea, Apr. 21-25, 2018. 3 pages.
Samsung "Downlink signal and channel design for NR-U" 3GPP TSG RAN WG1 Meeting #94 R1-1808766, Gothenburg, Sweden, Aug. 20-24, 2018. 5 pages.
First Office Action of the Chinese application No. 202011182700.9, dated Jun. 14, 2022. 18 pages with English translation.

* cited by examiner

METHOD FOR DETERMINING SLOT FORMAT, TERMINAL DEVICE AND NETWORK DEVICE

CROSS-REFERENCE TO RELATED APPLICATION

This application is a U.S. continuation application of International Application No. PCT/CN 2018/101188, entitled "METHOD AND DEVICE FOR DETERMINING SLOT-FORMAT AND STORAGE MEDIUM", filed on Aug. 17, 2018, the disclosure of which is hereby incorporated by reference in its entirety.

TECHNICAL FIELD

The disclosure relates to the technical field of wireless communications, and particularly relates to a method for determining a slot format, a terminal device and a network device.

BACKGROUND

In the 5th Generation (5G) New Radio (NR) system, a network device can configure transmission time for uplink transmission and downlink transmission and configure a slot-format.

SUMMARY

The embodiments of the disclosure provide a method for determining a slot format, a terminal device and a network device.

According to a first aspect, an embodiment of the disclosure provides a method for determining a slot format, including: a terminal device receives an indication signal from a network device, where the indication signal has a first association with a downlink transmission opportunity obtained by the network device; and the terminal device determines the slot format based on the indication signal.

According to a second aspect, an embodiment of the disclosure provides a method for determining a slot format, including: after obtaining a downlink transmission opportunity, a network device sends an indication signal to a terminal device, where the indication signal has a first association with a downlink transmission opportunity, and the indication signal is used for the terminal device to determine a slot format.

According to a third aspect, an embodiment of the disclosure provides a terminal device, including a network interface and a processor.

The network interface is configured to receive an indication signal from a network device, where the indication signal has a first association with a downlink transmission opportunity obtained by the network device; and the processor is configured to determine a slot format based on the indication signal.

According to a fourth aspect, an embodiment of the disclosure provides a network device, including a network interface.

The network interface is configured to send an indication signal to a terminal device after the network device obtains a downlink transmission opportunity, where the indication signal has a first association with the downlink transmission opportunity, and the indication signal is used for the terminal device to determine a slot format.

DETAILED DESCRIPTION

Figure 1:
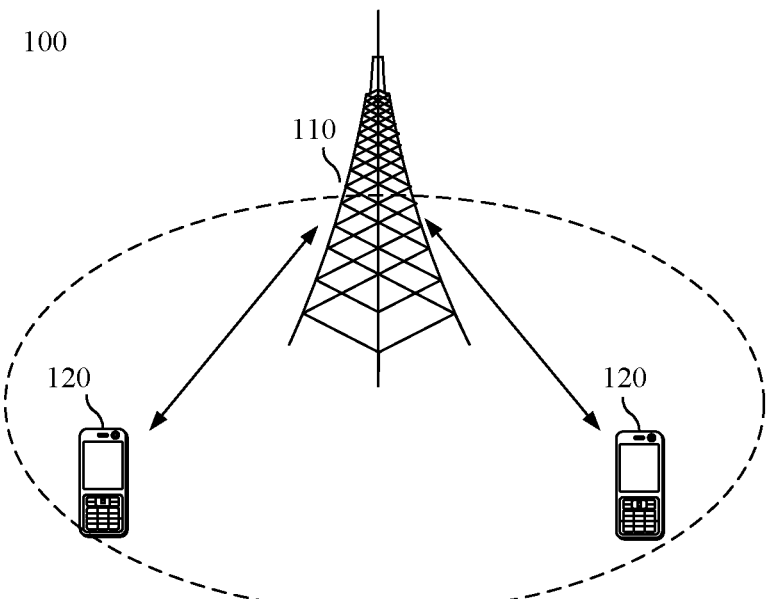
FIG. 1 is a schematic diagram of a composition structure of a communication system according to an embodiment of the disclosure.

In the related art, when the network device configures the slot-format, a terminal device cannot determine the slot-format in time within a limited transmission time, thereby reducing the data transmission efficiency.

In order to understand the features and technical contents of the embodiments of the disclosure in more detail, the implementation of the embodiments of the disclosure will be described in detail with reference to the accompanying drawings. The attached drawings are for reference only and are not intended to limit the embodiments of the disclosure.

Before the embodiments of the disclosure are described in detail, first, an implementation process of data transmission on the unlicensed spectrum and a manner for determining a slot-format in related technologies are briefly described.

The unlicensed spectrum is a spectrum that can be used for radio device communication divided by countries and regions. The unlicensed spectrum is generally considered as a shared spectrum. That is, communication devices in different communication systems can use the spectrum as long as they meet the legal requirements set by countries or regions on the spectrum, and there is no need to apply for a proprietary spectrum authorization from the government. In order to allow various communication systems that use the unlicensed spectrum for wireless communication to coexist friendly on the unlicensed spectrum, some countries or regions have stipulated the legal requirements that must be met when using the unlicensed spectrum. For example, in Europe, communication devices follow the "listen-before-talk" (LBT) principle. That is, before a communication device sends a signal on a channel of the unlicensed spectrum, the channel needs to be monitored first, and only when the channel monitoring result shows that the channel is idle, the communication device can send the signal. If the channel monitoring result of the communication device on the channel of the unlicensed spectrum shows that the channel is busy, the communication device cannot send the signal. Moreover, in order to ensure fairness, in one transmission, the duration of signal transmission by the communication device using the channel of the unlicensed spectrum cannot exceed the Maximum Channel Occupation Time (MCOT). In the NR unlicensed technology, the NR technology is used for data transmission on the unlicensed spectrum.

In a system that uses the unlicensed spectrum, the downlink channel and signal transmission of the network device may be discontinuous, and the terminal device does not know when the network device starts to occupy the downlink channel for transmission. Therefore, the terminal device needs to continuously detect the downlink channel, which increases the power consumption of the terminal device. In order to reduce the power consumption of the terminal device, after the channel monitoring result of the network device shows that the channel is idle, an indication signal is sent to the terminal device to notify the terminal device that the network device has obtained a downlink transmission opportunity. After receiving the indication signal, the terminal device starts to receive the corresponding downlink channel and signal, such as a physical down control channel (PDCCH) and a reference signal. Before receiving the indication signal, the terminal device may not detect the downlink channels and signals other than the indication signal, or may detect the downlink channels and signals including the indication signal in a longer period.

In related technologies, manners for determining a slot-format include: the network device performs semi-static configuration through tdd-UL-DL-Configuration, and the network device dynamically informs the terminal device of a slot format indicator (SFI) through a Group Common PDCCH.

When the network device performs semi-static configuration through tdd-UL-DL-Configuration, there is a problem of inflexible configuration of the slot-format.

In the NR system, the network device needs to perform LBT before sending the downlink channel, and the time for a downlink transmission to occupy the channel is limited, so that the transmission of downlink channel and signal may be discontinuous. After obtaining the downlink transmission opportunity through LBT, when the network device dynamically informs the terminal device of the SFI through the Group Common PDCCH, since the search space of the Group Common PDCCH is configured by the network device and is periodic, when the network device obtains the downlink transmission opportunity and it is not the time to send the Group Common PDCCH, the network device can not inform the terminal device of the SFI through the Group Common PDCCH in time within a limited transmission time. Since the terminal device cannot determine the slot-format in time, data transmission between the network device and the terminal device cannot be performed, which reduces the data transmission efficiency.

The technical solutions of the embodiments of the present disclosure may be applied to various communication systems, such as a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, or a 5G system.

Exemplarily, a communication system 100 that the embodiments of the present disclosure are applied is illustrated in FIG. 1. The communication system 100 may include a network device 110. The network device 110 may be a device that communicates with a terminal device 120 (or called a communication terminal or a terminal). The network device 100 may provide communication coverage for a particular geographic area, and may communicate with a terminal device located within the coverage area. The network device 110 may be a base transceiver station (BTS) in a GSM system or a CDMA system, or a NodeB (NB) in a WCDMA system, or an evolutional Node B (eNB or eNodeB) in an LTE system, or a wireless controller in a cloud radio access network (CRAN). Or the network device may be a mobile switching center, a relay station, an access point, a vehicle-mounted device, a wearable device, a hub, a switch, a network bridge, a router, a network side device in a 5G network, or a network device in a future evolved public land mobile network (PLMN), and the like.

The communication system 100 further includes at least one terminal device 120 located within the coverage area of the network device 110. As used herein, the "terminal device" includes, but is not limited to, a device arranged to receive/send a communication signal through a wired line connection, for example, through public switched telephone networks (PSTN), a digital subscriber line (DSL), digital cables, and direct cable connections; and/or through another data connection/network; and/or through a wireless interface, for example, for a cellular network, a wireless local area network (WLAN), a digital television network like a digital video broadcasting-handheld (DVB-H) network, a satellite network and an amplitude modulated (AM)-frequency modulated (FM) broadcast transmitter, and/or another communication terminal, and/or an Internet of Things (IoT) device. A terminal device configured to communicate through a wireless interface may be referred to as a "wireless communication terminal", a "wireless terminal" or a "mobile terminal". Examples of the mobile terminal include, but are not limited to, a satellite or cellular phone, a personal communications system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a global positioning system (GPS) receiver, and a conventional laptop and/or palmtop receiver or another electronic device including a radio telephone transceiver. The terminal device may refers to an access terminal, User Equipment (UE), a user unit, a user station, a mobile station, a mobile radio station, a remote station, a remote terminal, a mobile device, a user terminal, a terminal, a wireless communication device, a user proxy or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, a vehicle-mounted device, a wearable device, a terminal device in a 5G network, or a terminal device in a future evolved PLMN.

In some embodiments, device to device (D2D) communication may be performed between terminal devices 120.

In some embodiments, the 5G system or 5G network may also be referred to as a new radio (NR) system or NR network.

FIG. 1 exemplarily illustrates a network device and two terminal devices. In some embodiments, the communication system 100 may include a plurality of network devices and the coverage area of each network device may include other numbers of terminal devices, which is not limited in the embodiments of the present disclosure.

In some embodiments, the communication system 100 may further include other network entities, such as a network controller and a mobility management entity, which are not limited in the embodiments of the present disclosure.

It should be understood that in the embodiments of the present disclosure, devices with communication functions in the network/system may be referred to as communication devices. Taking the communication system 100 illustrated in FIG. 1 as an example, communication devices may include the network device 110 and terminal device 120 with the communication function, and the network device 110 and the terminal devices 120 may be the specific devices described above, which will not be elaborated herein. The communication device may also include other devices in the communication system 100, such as other network entities including a network controller and a mobility management entity, which are not limited in the embodiments of the present disclosure.

Figure 2:
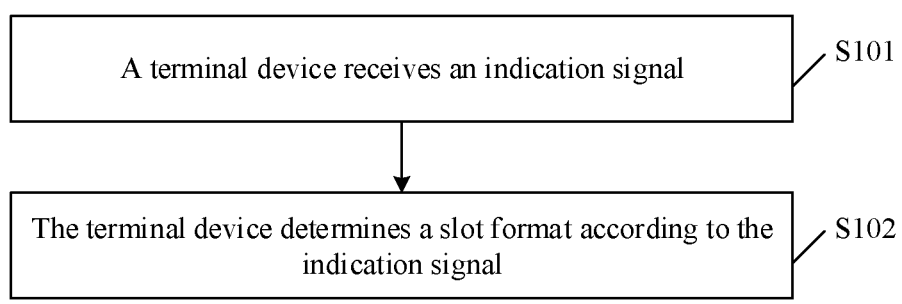
FIG. 2 is a schematic diagram of an optional processing flow of a method for determining a slot format, applied to a terminal device, according to an embodiment of the disclosure.

As illustrated in FIG. 2, the optional processing flow of the method for determining a slot format, applied to a terminal device, provided by an embodiment of the disclosure includes the following operations:

In S101, a terminal device receives an indication signal.

In the embodiments of the disclosure, the terminal device receives the indication signal sent by the network device, and the indication signal has a first association with a downlink transmission opportunity.

The downlink transmission opportunity means that when the channel monitored by the network device is idle, the network device may perform downlink transmission in the idle channel, that is, the network device obtains the downlink transmission opportunity. The first association refers to information carried in the indication signal sent by the network device, and is suitable for downlink transmission in a time unit corresponding to the downlink transmission opportunity.

The indication signal is used for indicating a manner in which the terminal device determines a slot format for downlink transmission, or the indication signal is used for notifying a slot format.

In some embodiments, when the indication signal is used for notifying the slot format, the network device and the terminal device pre-appoint at least one slot format, and appoint a respective identification code corresponding to each slot format. The indication information sent by the network device carries an identification code, and the terminal device may determine the slot format corresponding to the identification code according to the identification code carried in the received indication information.

In addition to a manner in which the terminal device determines the slot format for downlink transmission, or the slot format, information carried in the indication signal may further include at least one of the following: a time when the terminal device starts to detect a downlink channel, a time when the terminal device starts to receive a downlink channel, a time when the network device obtains a downlink transmission opportunity, or a time when the network device starts to perform downlink transmission.

Since the indication signal has a first association with the downlink transmission opportunity, the slot format determined according to the indication signal is a slot format in the time unit corresponding to the downlink transmission opportunity. It can also be understood that the slot format determined according to the indication signal is suitable for downlink transmission in the time unit corresponding to the current downlink transmission opportunity. After the time unit corresponding to the current downlink transmission opportunity ends, when the network device obtains the downlink transmission opportunity again, it needs to send an indication signal for determining a slot format again.

The slot format described in the embodiments of the disclosure indicates that a symbol in a slot is an uplink symbol, or a downlink symbol, or a flexible symbol.

In S102, the terminal device determines the slot format according to the indication signal.

When the indication signal is used for indicating a manner in which the terminal device determines the slot format, the manner in which the terminal device determines the slot format includes at least one of: a system message, a radio resource control (RRC) message, or downlink control information (DCI). That is, the terminal device may determine the slot format through at least one of the system message, RRC or DCI sent by the network device. The DCI is information carried by the PDCCH.

In some embodiments, the terminal device obtains a manner in which the terminal device determines the slot format based on at least one of the time domain, frequency domain or code domain of the indication signal sent by the network device, and the terminal device determines the slot format based on the slot format indication information carried in the obtained manner. Here, the slot format indication information is used for indicating the slot format.

In some embodiments, when the terminal device determines the slot format indication information through the PDCCH sent by the network device, the slot format indication information may be determined through the Group Common PDCCH sent by the network device, or the slot format indication information may be determined through any PDCCH. Any PDCCH may be a PDCCH necessary for data transmission between the network device and the terminal device, and the necessary PDCCH carries the slot format indication information. Any PDCCH may also be a newly-added PDCCH, and the newly-added PDCCH is only used for carrying the slot format indication information.

When the indication signal is used for notifying the slot format, the network device and the terminal device pre-appoint at least one slot format, and appoint a respective identification code corresponding to each slot format. The indication information sent by the network device carries an identification code, and the terminal device may determine the slot format corresponding to the identification code according to the identification code carried in the received indication information.

Figure 3:
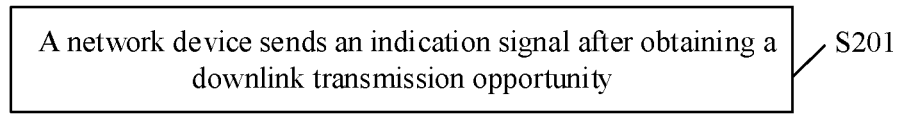
FIG. 3 is a schematic diagram of an optional processing flow of a method for determining a slot format, applied to a network device, according to an embodiment of the disclosure.

As illustrated in FIG. 3, the optional processing flow of the method for determining a slot format, applied to a network device, provided by an embodiment of the disclosure includes the following operations:

In S201, a network device sends an indication signal after obtaining a downlink transmission opportunity.

In the embodiments of the disclosure, the network device sends an indication signal to the terminal device, and the indication signal has a first association with the downlink transmission opportunity.

The downlink transmission opportunity means that when the channel monitored by the network device is idle, the network device may perform downlink transmission in the idle channel, that is, the network device obtains the downlink transmission opportunity. The first association refers to information carried in the indication signal sent by the network device, and is suitable for downlink transmission in a time unit corresponding to the downlink transmission opportunity.

The indication signal is used for indicating a manner in which the terminal device determines a slot format for downlink transmission, or the indication signal is used for notifying a slot format.

In some embodiments, when the indication signal is used for notifying the slot format, the network device and the terminal device pre-appoint at least one slot format, and appoint a respective identification code corresponding to each slot format. The indication information sent by the network device carries an identification code, and the terminal device may determine the slot format corresponding to the identification code according to the identification code carried in the received indication information.

In addition to a manner in which the terminal device determines the slot format for downlink transmission, or the slot format, the information carried in the indication signal may further include at least one of the following: a time when the terminal device starts to detect a downlink channel, a time when the terminal device starts to receive a downlink channel, a time when the network device obtains a downlink transmission opportunity, or a time when the network device starts to perform downlink transmission.

Since the indication signal has a first association with the downlink transmission opportunity, the slot format determined according to the indication signal is a slot format in the time unit corresponding to the downlink transmission opportunity. It can also be understood that the slot format determined according to the indication signal is applicable to downlink transmission in the time unit corresponding to the current downlink transmission opportunity. After the time unit corresponding to the current downlink transmission opportunity ends, when the network device obtains the downlink transmission opportunity again, it needs to send an indication signal for determining a slot format again.

In some embodiments, the manner in which the terminal device determines the slot format includes at least of the following: system message, RRC, or DCI.

In some embodiments, at least one of the time domain, frequency domain or code domain of the indication signal is used for indicating the manner in which the terminal device determines the slot format, and the slot format indication information carried in the manner is used for determining the slot format.

In the embodiments of the disclosure, after obtaining a downlink transmission opportunity, the network device sends an indication signal to the terminal device, and the indication signal may indicate a manner in which the terminal device obtains the slot format indication information. The terminal device obtains the slot format indication information through the manner indicated in the indication signal, so as to obtain the slot format in the slot format indication information. Therefore, the slot format may be determined as soon as possible between the network device and the terminal device within a limited downlink transmission time, and the downlink transmission is performed based on the determined slot format, so as to improve the data transmission efficiency. Furthermore, after obtaining the downlink transmission opportunity, the network device dynamically sends an indication signal for determining a slot format to the terminal device in a manner of sending indication information, so as to avoid the problem of inflexible configuration of the slot format caused by semi-static configuration of the slot format of the network device.

An embodiment of the disclosure further provides a method for determining a slot format, applied to a communication system composed of a network device and a terminal device, including:

In S301, the network device sends an indication signal after obtaining a downlink transmission opportunity.

In S302, the terminal device receives the indication signal.

In S303, the terminal device determines a slot format according to the indication signal.

Figure 4:
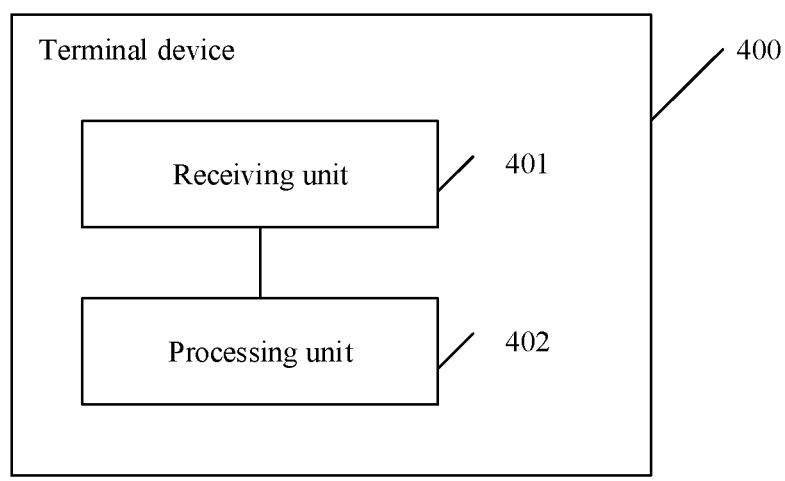
FIG. 4 is a schematic diagram of a composition structure of a terminal device according to an embodiment of the disclosure.

An embodiment of the disclosure further provides a terminal device. As illustrated in FIG. 4, the terminal device 400 includes a receiving unit 401 and a processing unit 402.

The receiving unit 401 is configured to receive an indication signal which has a first association with a downlink transmission opportunity.

The processing unit 402 is configured to determine a slot format according to the indication signal.

In the embodiments of the disclosure, the indication signal is used for indicating a manner in which the terminal device determines the slot format, or the indication signal is used for notifying the slot format. The indication signal is further used for indicating at least one of the following: a time when the terminal device starts to detect a downlink channel, a time when the terminal device starts to receive a downlink channel, a time when the network device obtains a downlink transmission opportunity, or a time when the network device starts to perform downlink transmission.

The manner in which the terminal device determines the slot format includes at least one of the following: system message, RRC, or DCI.

In some embodiments, the processing unit 402 is configured to determine the slot format based on at least one of the time domain, frequency domain, or code domain of the indication signal.

In some embodiments, the processing unit 402 is configured to obtain a manner for determining the slot format based on at least one of the time domain, frequency domain, or code domain of the indication signal; and
determine the slot format based on slot format indication information carried in the manner.

The slot format in the embodiments of the disclosure is a slot format in a time unit corresponding to the downlink transmission opportunity.

Figure 5:
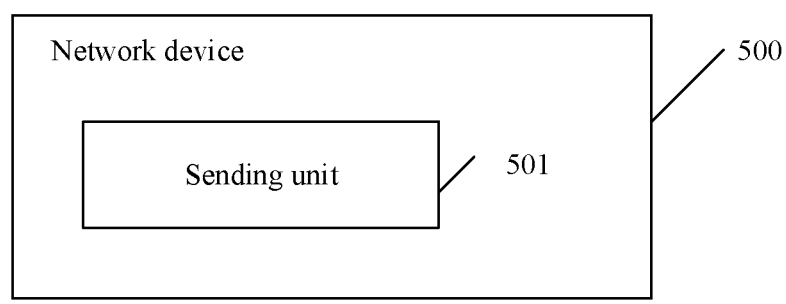
FIG. 5 is a schematic diagram of a composition structure of a network device according to an embodiment of the disclosure.

An embodiment of the disclosure further provides a network device. As illustrated in FIG. 5, the network device 500 includes a sending unit 501.

The sending unit 501 is configured to send an indication signal after obtaining a downlink transmission opportunity. The indication signal has a first association with the downlink transmission opportunity, and the indication signal is used for a terminal device to determine a slot format.

In the embodiments of the disclosure, the indication signal is used for indicating a manner in which the terminal device determines the slot format, or the indication signal is used for notifying the slot format.

The indication signal is further used for indicating at least one of the following:
a time when the terminal device starts to detect a downlink channel, a time when the terminal device starts to receive a downlink channel, a time when the network device obtains a downlink transmission opportunity, or a time when the network device starts to perform downlink transmission.

In some embodiments, the manner in which the terminal device determines the slot format includes at least one of the following: system message, RRC, or DCI.

In some embodiments, the condition that the indication signal is used for the terminal device to determine the slot format includes: at least one of the time domain, frequency domain, or code domain of the indication signal is used for the terminal device to determine the slot format.

In some embodiments, the at least one of the time domain, frequency domain, or code domain of the indication signal is used for the terminal device to determine the slot format includes:

at least one of the time domain, frequency domain, or code domain of the indication signal is used for indicating a manner in which the terminal device determines the slot format; and the slot format indication information carried in the manner is used for determining the slot format.

In the embodiments of the disclosure, the slot format is a slot format in a time unit corresponding to the downlink transmission opportunity.

An embodiment of the disclosure further provides a terminal device, including a processor and a memory configured to store a computer program executable by the processor. The processor is configured to execute the method for determining a slot format, performed by the terminal device, when the computer program runs.

An embodiment of the disclosure further provides a network device, including a processor and a memory configured to store a computer program executable by the processor. The processor is configured to execute the method for determining a slot format, performed by the network device, when the computer program runs.

Figure 6:
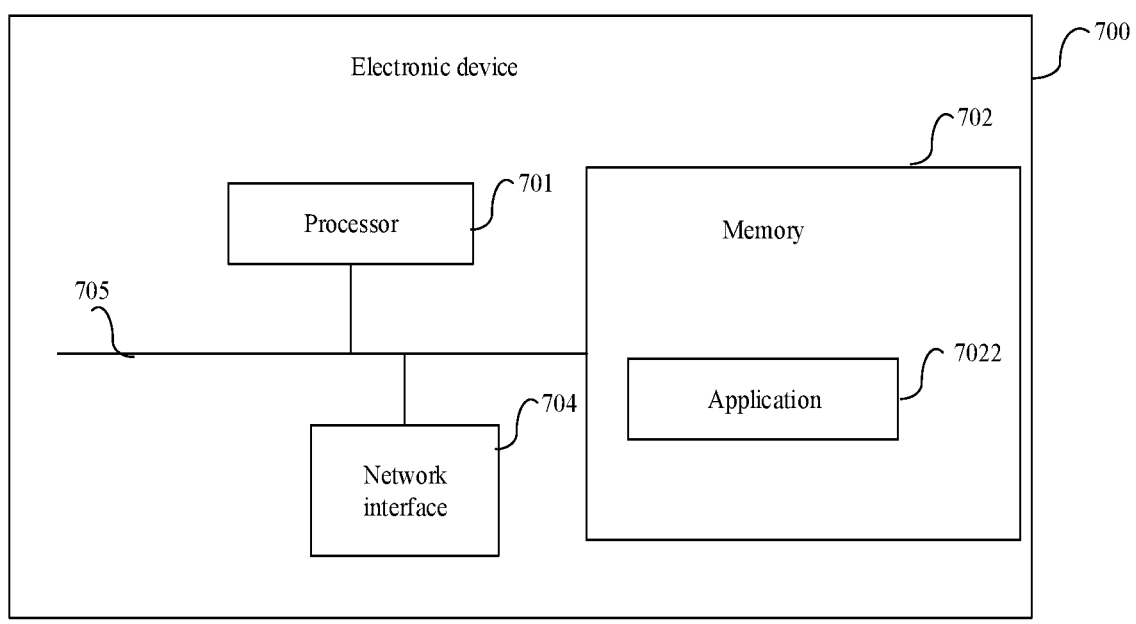
FIG. 6 is a schematic diagram of a hardware composition structure of an electronic device according to an embodiment of the disclosure.

FIG. 6 is a schematic diagram of a hardware composition structure of an electronic device (a network device or a terminal device) according to an embodiment of the disclosure. The electronic device 700 includes: at least one processor 701, a memory 702 and at least one network interface 704. All components in the electronic device 700 are coupled together through a bus system 705. It can be understood that the bus system 705 is configured to implement connection and communication between these components. The bus system 705 includes a power bus, a control bus and a status signal bus in addition to a data bus. However, for the sake of clarity, various buses are marked as the bus system 705 in FIG. 6.

It can be understood that the memory 702 may be a volatile memory or a non-volatile memory, or may include both the volatile memory and the non-volatile memory. The non-volatile memory may be a read-only memory (ROM), a programmable read-only memory (PROM), an Erasable Programmable Read-Only Memory (EPROM), an electrically erasable programmable read-only memory (EEPROM), a ferromagnetic random access memory (FRAM), a flash memory, a magnetic surface memory, a compact disc, or a compact disc read-only memory (CD-ROM). The magnetic surface memory may be a magnetic disc memory or a magnetic tape memory. The volatile memory may be a random access memory (RAM) used as an external cache. By way of exemplary but not restrictive illustration, many forms of RAM are available, such as a static random access memory (SRAM), a synchronous static random access memory (SSRAM), a dynamic random access memory (DRAM), a Synchronous Dynamic Random Access Memory (SDRAM), a double data rate synchronous dynamic random access memory (DDRSD RAM), an enhanced synchronous dynamic random access memory (ESDRAM), a synclink dynamic random access memory (SLDRAM), and a direct rambus random access memory (DRRAM). The memory 702 described in the embodiments of the disclosure is intended to include, but is not limited to, these memories and any other suitable types of memories.

The memory 702 in the embodiments of the disclosure is configured to store various types of data to support the operation of the electronic device 700. Examples of these data include: any computer program for operating on the electronic device 700, such as an application program 7022. The program for implementing the method in the embodiments of the disclosure may be included in the application program 7022.

The method disclosed in the foregoing embodiments of the disclosure may be applied to the processor 701 or implemented by the processor 701. The processor 701 may be an integrated circuit chip and has a signal processing capability. In an implementation process, each step of the above method may be completed by an integrated logic circuit of hardware in the processor 701 or one or more instructions in a software form. The above processor 701 may be a general-purpose processor, a digital signal processor (DSP), or other programmable logic devices, discrete gate or transistor logic devices, discrete hardware components, and the like. Various methods, steps and logical block diagrams disclosed in the embodiments of the disclosure may be implemented or performed by the processor 701. The general-purpose processor may be a microprocessor or any conventional processor. The steps of the method disclosed in combination with the embodiments of the disclosure may be directly performed by a hardware decoding processor, or may be performed by a combination of hardware and software modules in a decoding processor. The software module may be located in a storage medium, the storage medium is located in the memory 702, and the processor 701 reads the information from the memory 702 and completes the steps of the above method in combination with its hardware.

In an exemplary embodiment, the electronic device 700 may be implemented by one or more of an application specific integrated circuit (ASIC), a DSP, a programmable logic device (PLD), a complex programmable logic device (CPLD), an FPGA, a general-purpose processor, a controller, an MCU, an MPU or other electronic components, and is configured to perform the above method.

An embodiment of the present disclosure further provides a computer-readable storage medium configured to store computer programs.

The computer-readable storage medium may be applied to the network device in the embodiments of the present disclosure, and the computer program enables the computer to execute the corresponding process implemented by the network device in each method of the embodiments of the present disclosure. For brevity, the details are not described here.

In some embodiments, the computer-readable storage medium may be applied to the terminal device in the embodiments of the present disclosure, and the computer program enables the computer to execute the corresponding process implemented by the terminal device in each method of the embodiments of the present disclosure. For brevity, the details are not described here.

The disclosure is described with reference to flow diagrams and/or block diagrams of methods, devices (systems) and computer program products according to the embodiments of the disclosure. It should be understood that each flow and/or block in flow diagrams and/or block diagrams and a combination of flows and/or blocks in flow diagrams and/or block diagrams may be implemented by computer program instructions. These computer program instructions may be provided to a processor of a general-purpose computer, a special-purpose computer, an embedded processor or other programmable data processing devices to produce a machine, so that the instructions executed by the processor of a computer or other programmable data processing devices generate an apparatus configured to implement the functions specified in one flow or multiple flows in flow diagrams and/or one block or multiple blocks in block diagrams.

These computer program instructions may also be stored in a computer-readable memory that can guide a computer or other programmable data processing devices to work in a specific mode, so that the instructions stored in the computer-readable memory generate a manufactured product including an instruction apparatus, and the instruction apparatus implements the functions specified in one flow or multiple flows in flow diagrams and/or one block or multiple blocks in block diagrams.

These computer program instructions may also be loaded onto a computer or other programmable data processing devices, so that a series of operation steps are performed on the computer or other programmable apparatuses to generate computer-implemented processing, and then, the instructions executed on the computer or other programmable devices provide steps for implementing the functions specified in one flow or multiple flows in flow diagrams and/or one block or multiple blocks in block diagrams.

The embodiments described above are merely preferred embodiments of the disclosure, and are not intended to limit the protection scope of the disclosure. Any modification, equivalent replacement and improvement made within the spirit and principle of the disclosure are intended to be included within the protection scope of the disclosure.

The invention claimed is:

1. A method for determining a slot format, comprising:
   receiving, by a terminal device, an indication signal from a network device, wherein the indication signal has a first association with a downlink transmission opportunity obtained by the network device, and the indication signal carries an identification code corresponding to a slot format and indicates a slot format corresponding to the downlink transmission opportunity, the slot format corresponding to the downlink transmission opportunity being formats of slots inside the downlink transmission opportunity; and
   determining, by the terminal device, the slot format according to the indication signal.

2. The method of claim 1, wherein the indication signal indicates at least one of the following:
   a time when the terminal device starts to detect a downlink channel;
   a time when the terminal device starts to receive the downlink channel;
   a duration of the downlink transmission opportunity; or
   a starting time of downlink transmission.

3. The method of claim 1, wherein the indication signal comprises downlink control information (DCI).

4. The method of claim 1, further comprising:
   receiving, by the terminal device according to the slot format, downlink transmission of the network device in the time unit corresponding to the downlink transmission opportunity.

5. A method for determining a slot format, comprising:
   sending, by a network device, an indication signal to a terminal device after obtaining a downlink transmission opportunity,
   wherein the indication signal has a first association with the downlink transmission opportunity, and the indication signal is used for the terminal device to determine a slot format, and
   wherein the indication signal carries an identification code corresponding to the slot format and indicates a slot format corresponding to the downlink transmission opportunity, the slot format corresponding to the downlink transmission opportunity being formats of slots inside the downlink transmission opportunity.

6. The method of claim 5, wherein the indication signal indicates at least one of the following:
   a time when the terminal device starts to detect a downlink channel;
   a time when the terminal device starts to receive the downlink channel;
   a duration of the downlink transmission opportunity; or
   a starting time of downlink transmission.

7. The method of claim 5, wherein the indication signal comprises downlink control information (DCI).

8. The method of claim 5, further comprising:
   performing, by the network device, downlink transmission in the time unit corresponding to the downlink transmission opportunity according to the slot format.

9. A terminal device, comprising:
   a network interface, configured to receive an indication signal from a network device, wherein the indication signal has a first association with a downlink transmission opportunity obtained by the network device, and the indication signal carries an identification code corresponding to a slot format and indicates a slot format corresponding to the downlink transmission opportunity, the slot format corresponding to the downlink transmission opportunity being formats of slots inside the downlink transmission opportunity; and
   a processor, configured to determine the slot format according to the indication signal.

10. The terminal device of claim 9, wherein the indication signal indicates at least one of the following:
    a time when the terminal device starts to detect a downlink channel;
    a time when the terminal device starts to receive the downlink channel;
    a duration of the downlink transmission opportunity; or
    a starting time of downlink transmission.

11. The terminal device of claim 9, wherein the indication signal comprises downlink control information (DCI).

12. The terminal device of claim 9, wherein the network interface is further configured to receive, according to the slot format, downlink transmission of the network device in the time unit corresponding to the downlink transmission opportunity.

13. A network device, comprising:
    a network interface, configured to send an indication signal to a terminal device after the network device obtains a downlink transmission opportunity,
    wherein the indication signal has a first association with the downlink transmission opportunity, and the indication signal is used for the terminal device to determine a slot format, and
    wherein the indication signal carries an identification code corresponding to the slot format and indicates a slot format corresponding to the downlink transmission opportunity, the slot format corresponding to the downlink transmission opportunity being formats of slots inside the downlink transmission opportunity.

14. The network device of claim 13, wherein the indication signal indicates at least one of the following:
    a time when the terminal device starts to detect a downlink channel;
    a time when the terminal device starts to receive the downlink channel;
    a duration of the downlink transmission opportunity; or
    a starting time of downlink transmission.

15. The network device of claim 13, wherein the indication signal comprises downlink control information (DCI).

\* \* \* \* \*